(12) United States Patent
Sato et al.

(10) Patent No.: US 12,538,023 B2
(45) Date of Patent: Jan. 27, 2026

(54) IMAGING APPARATUS, FOCUS CONTROL METHOD, AND PROGRAM

(71) Applicant: Sony Group Corporation, Tokyo (JP)

(72) Inventors: Yoshitaka Sato, Kanagawa (JP); Yoshinori Yamatsuta, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 220 days.

(21) Appl. No.: 18/547,942

(22) PCT Filed: Feb. 10, 2022

(86) PCT No.: PCT/JP2022/005342
§ 371 (c)(1),
(2) Date: Aug. 25, 2023

(87) PCT Pub. No.: WO2022/209341
PCT Pub. Date: Oct. 6, 2022

(65) Prior Publication Data
US 2024/0147067 A1   May 2, 2024

(30) Foreign Application Priority Data
Mar. 30, 2021   (JP) ................. 2021-056832

(51) Int. Cl.
*H04N 23/67* (2023.01)
*G02B 7/40* (2021.01)
*G03B 13/20* (2021.01)
*G03B 13/36* (2021.01)
*H04N 23/667* (2023.01)

(52) U.S. Cl.
CPC ............. *H04N 23/675* (2023.01); *G02B 7/40* (2013.01); *G03B 13/20* (2013.01); *G03B 13/36* (2013.01); *H04N 23/667* (2023.01)

(58) Field of Classification Search
CPC .... H04N 23/675; H04N 23/667; H04N 23/60; G02B 7/40; G02B 7/28; G03B 13/20; G03B 13/36; G03B 17/02
See application file for complete search history.

(56) References Cited

U.S. PATENT DOCUMENTS

| | | | |
|---|---|---|---|
| 2011/0305446 A1* | 12/2011 | Itoh ................. | G03B 13/36 396/95 |
| 2015/0116577 A1* | 4/2015 | Lin .................. | G02B 7/36 348/345 |
| 2024/0046477 A1* | 2/2024 | Feng ................ | H04N 23/67 |

FOREIGN PATENT DOCUMENTS

| | | |
|---|---|---|
| JP | 2004280048 A | 10/2004 |
| JP | 2012002951 A | 1/2012 |
| JP | 2017003827 A | 1/2017 |
| JP | 2020156814 A | 10/2020 |

OTHER PUBLICATIONS

International Search Report (PCT/ISA/210), International Application No. PCT/JP2022/005342, dated Mar. 15, 2022.

* cited by examiner

*Primary Examiner* — Shahbaz Nazrul
(74) *Attorney, Agent, or Firm* — Michael Best & Friedrich LLP

(57) ABSTRACT

Disclosed is an imaging apparatus that includes an autofocus processing section and a focus range control section. The autofocus processing section executes autofocus control over a subject within a focus range that is set as a range of a depth-direction distance. The focus range control section changes the settings of the focus range after the subject is focused under the autofocus control.

19 Claims, 12 Drawing Sheets

A

B

A

B

C

A

B

C

D

IMAGING APPARATUS, FOCUS CONTROL METHOD, AND PROGRAM

TECHNICAL FIELD

The present technology relates to an imaging apparatus, a focus control method, and a program, and more particularly relates to autofocus control.

BACKGROUND ART

When images are to be captured by an imaging apparatus, such as a still camera or a video camera, the imaging apparatus is focused on an imaging target. However, the method of focusing is roughly divided into two types, namely, manual focusing and autofocusing. In manual focusing, a user operates a camera so as to focus the camera on a target subject. In autofocusing, the camera automatically focuses on the target subject.

A technology for autofocus control is disclosed in PTL 1 below.

CITATION LIST

Patent Literature

[PTL 1]
Japanese Patent Laid-open No. 2020-156814

SUMMARY

Technical Problems

Incidentally, in a case where autofocus control is exercised to allow the imaging apparatus to automatically perform a focus operation, the imaging apparatus does not always focus on a subject desired by the user. In view of this, in order to make it relatively easy for the imaging apparatus to exercise autofocus on the subject desired by the user, a technology is now available to limit a particular range and select a subject within the limited range as an autofocus control target.

However, limiting the autofocus range also causes another problem where a tracking capability decreases.

In view of the above circumstances, the present disclosure proposes a technology for providing autofocus control so as to facilitate focusing on the subject desired by the user without sacrificing the tracking capability.

Solution to Problems

An imaging apparatus according to the present technology includes an autofocus processing section and a focus range control section. The autofocus processing section executes autofocus control over a subject within a focus range that is set as a range of a depth-direction distance. The focus range control section changes settings of the focus range after the subject is focused by the autofocus control.

As a function for an autofocus (hereinafter may be referred to also as "AF") operation, for example, an AF range control function is provided. The AF range control function sets the focus range, which is the range of the depth-direction distance, and executes autofocus control over the subject within the focus range. In this instance, the focus range after focusing differs from the focus range before focusing.

DESCRIPTION OF EMBODIMENTS

Embodiments of the present technology will now be described in the following order.

<1. Configuration of Imaging Apparatus>
<2. AF Range Control Function>
<3. First Embodiment>
<4. Second Embodiment>
<5. Process Performed on Aperture Mechanism>
<6. Outline and Modifications>

First, meanings of some terms used in the present disclosure are described below.

"Image" is used as the term denoting both a "still image" and a "moving image."

"Distance" and "depth" denote the distance between an imaging apparatus 100 and a subject which is measured by the imaging apparatus 100.

"Near," "far," and other terms indicative of distance are used to indicate nearness or farness from the imaging apparatus 100. "Infinity" indicates a state where something is at an infinitely far distance.

A "range control function" described in the present disclosure is a function of providing AF control over a subject within a distance range that is set in the depth direction as viewed at least from the imaging apparatus 100. In the description of the embodiments, this function is referred to as the "AF range control function."

A focus range indicating the distance range set by the AF range control function is referred to as the "AF range."

Further, as regards the AF range, the terms "near end" and "far end" are used. The "near end" indicates an AF range limit point that is relatively near the imaging apparatus 100. The "far end" indicates an AF range limit point that is relatively far from the imaging apparatus 100.

It should be noted that the AF range control function not only sets the range of depth-direction distance, but occasionally sets the range of image in-plane direction region.

1. Configuration of Imaging Apparatus

An example configuration of the imaging apparatus 100 according to an embodiment of the present technology will now be described with reference to FIGS. 1 to 3.

Figure 1:
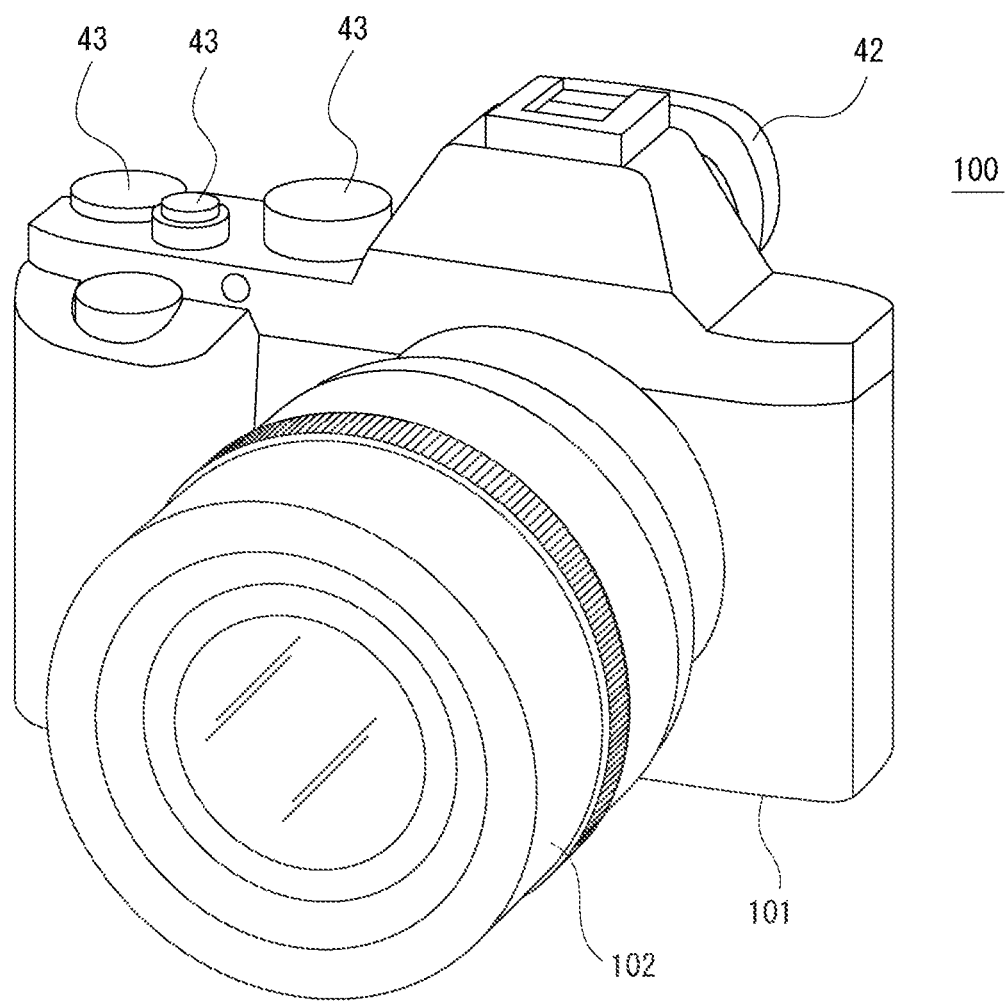
FIG. 1 is a perspective view of an imaging apparatus according to embodiments of the present technology.

FIG. 1 is a perspective view of the imaging apparatus 100. FIG. 2 is an explanatory diagram illustrating a panel surface of the imaging apparatus 100. It is assumed that the imaging apparatus 100 includes, for example, a digital still camera, and can capture both a still image and a moving image by performing imaging mode switching.

It should be noted that the imaging apparatus 100 according to the present embodiment is not limited to a digital still camera. The imaging apparatus 100 may include a video camera used mainly for capturing moving images, a camera capable of capturing only still images, or a camera capable of capturing only moving images. Obviously, the imaging apparatus 100 may include a professional camera used, for example, in a broadcasting station.

The imaging apparatus 100 is configured such that a lens barrel 102 is attached to a main body housing 101 included in a camera main body.

In a case where the imaging apparatus 100 is configured as what is generally called a lens-replaceable camera, the lens barrel 102 is detachable from the main body housing 101 so as to permit lens replacement.

Further, there may be a case where the lens barrel 102 is undetachable from the main body housing 101. In some cases, the imaging apparatus 100 is configured such that, for example, the lens barrel 102 is secured to the main body housing 101 or designed as a retractable type capable of collapsing and protruding. The retractable type collapses into the front surface of the main body housing 101 for storage purposes and protrudes to become usable.

Figure 2:
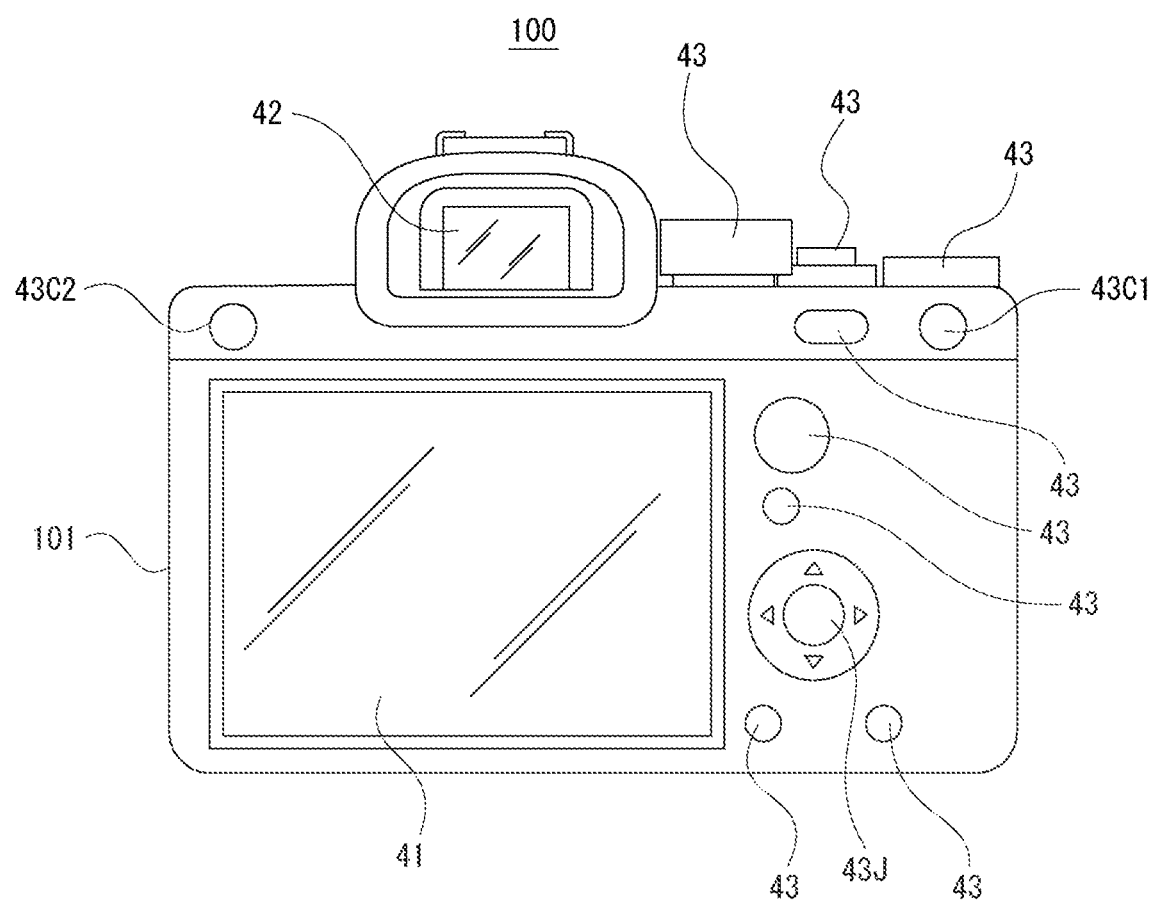
FIG. 2 is an explanatory diagram illustrating a panel surface of the imaging apparatus according to the embodiments.

As depicted in FIG. 2, a display panel 41, such as a liquid crystal display (LCD: Liquid Crystal Display) or an organic EL (Electro-Luminescence) display, is mounted on the panel surface, which faces a user of the imaging apparatus 100.

Further, as a viewfinder 42, a display section formed by using, for example, an LCD or an organic EL display is mounted. For example, an electronic view finder (EVF: Electronic View Finder) is used as the viewfinder 42. Alternatively, an optical view finder (OVF: Optical View Finder) or a hybrid view finder (HVF: Hybrid View Finder) formed by transmissible liquid crystal may be used as the viewfinder 42.

The user is able to visually recognize images and various types of information by using the display panel 41 and the viewfinder 42. In this example, the display panel 41 and the viewfinder 42 are both mounted on the imaging apparatus 100. However, the imaging apparatus 100 is not limited to such a configuration. Alternatively, only either the display panel 41 or the viewfinder 42 may be mounted on the imaging apparatus 100, or either one of or both the display panel 41 and the viewfinder 42 may be detachable.

Various types of operating elements 43 are mounted on the main body housing 101 of the imaging apparatus 100.

For example, operating elements of various shapes, such as keys, dials, and depressible or rotatable complex operating elements, are provided as the operating elements 43 to implement various operational functions. It is assumed that the operating elements 43 are able to perform, for example, a menu operation, a reproducing operation, a mode selection operation, a focus operation, a zoom operation, and an operation for selecting a parameter such as a shutter speed and an f-number.

The operating elements 43 are not individually described in detail here. However, in the present embodiment, the operating elements 43 include two custom buttons 43C1 and 43C2. The custom buttons 43C1 and 43C2 are operating elements that are referred to also as the assignable buttons. Each of the custom buttons 43C1 and 43C2 is assigned a predetermined operational function in an initial state, and can be assigned a desired operational function by the user.

It should be noted that the number of custom buttons is not limited to two. One or three or more custom buttons may be mounted.

Further, a cross key 43J is provided as one of the operating elements 43. The user operates the cross key 43J by pressing its center or its upper, lower, left, or right end. The cross key 43J is used, for example, for cursor operation or enter operation.

Figure 3:
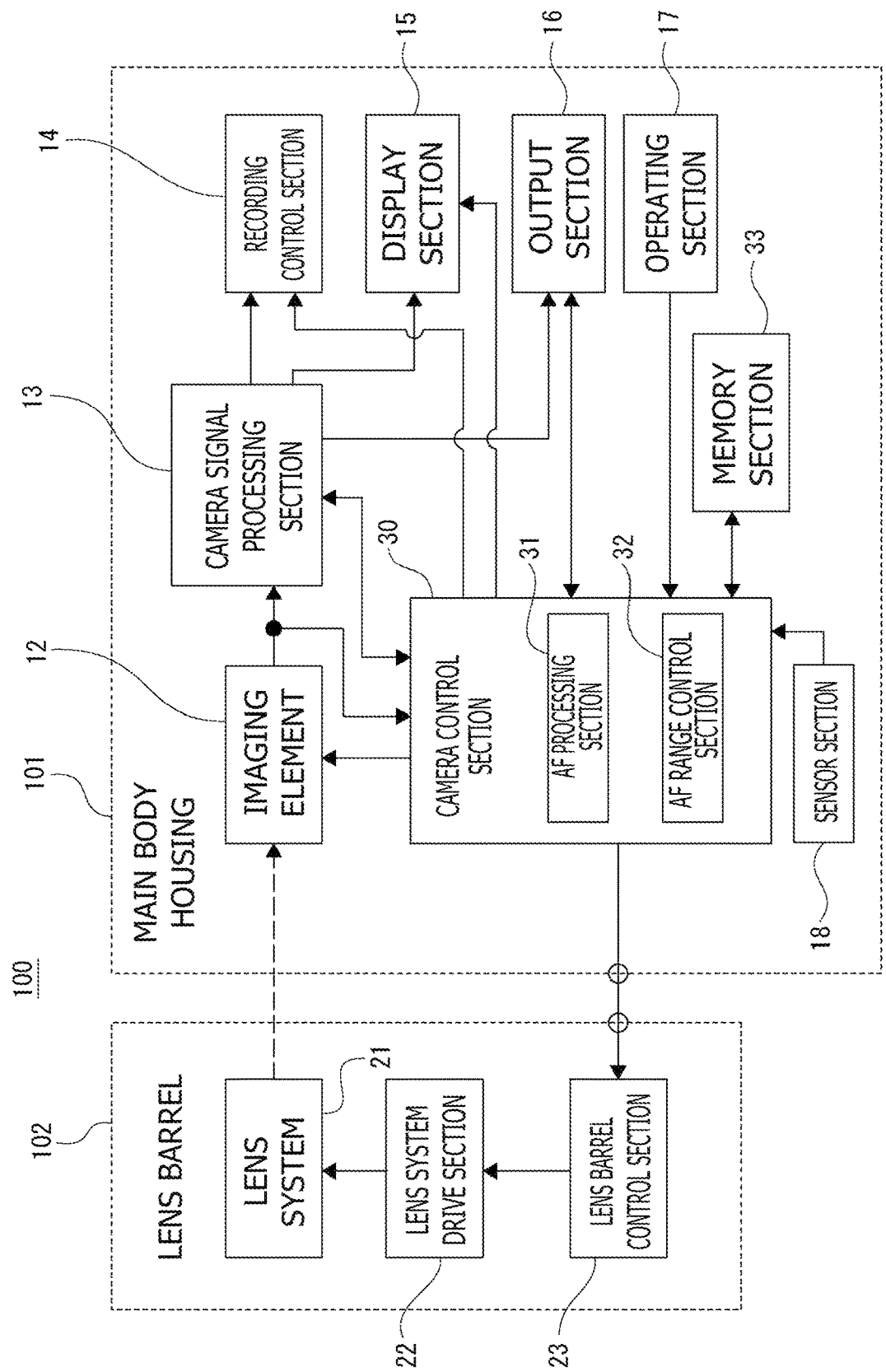
FIG. 3 is a block diagram illustrating the imaging apparatus according to the embodiments.

FIG. 3 illustrates an internal configuration of the imaging apparatus 100 including the lens barrel 102. It should be noted that FIG. 3 depicts an example configuration where the imaging apparatus 100 is divided into the main body housing 101 and the lens barrel 102.

The main body housing 101 of the imaging apparatus 100 includes an imaging element (image sensor) 12, a camera signal processing section 13, a recording control section 14, a display section 15, an output section 16, an operating section 17, a sensor section 18, a camera control section 30, and a memory section 33.

Meanwhile, the lens barrel 102 includes a lens system 21, a lens system drive section 22, and a lens barrel control section 23.

The lens system 21 in the lens barrel 102 includes an aperture mechanism and lenses such as a zoom lens and a focus lens. The lens system 21 guides light (incident light) from the subject until the light is condensed on the imaging element 12.

The imaging element 12 is configured, for example, as a CCD (Charge Coupled Device) imaging element or as a CMOS (Complementary Metal Oxide Semiconductor) imaging element.

The imaging element 12 photoelectrically converts received light to obtain an electrical signal, performs, for example, a CDS (Correlated Double Sampling) or AGC (Automatic Gain Control) process on the obtained electrical signal, and then performs an A/D (Analog/Digital) conversion process to obtain an image signal. Further, the imaging element 12 outputs the obtained imaging signal, which is in the form of digital data, to the camera signal processing section 13 and the camera control section 30, which are in a stage following the imaging element 12.

The camera signal processing section 13 is configured as an image processor that is formed, for example, by a DSP (Digital Signal Processor). The camera signal processing section 13 performs various signal processes on the digital signal (captured image signal) sent from the imaging element 12. More specifically, the camera signal processing section 13 performs a correction process on the color channels of R, G, and B, and other correction processes such as white balance correction, aberration correction, and shading correction processes. Further, the camera signal processing section 13 performs various other processes such as a YC generation process of generating (separating) a luminance (Y) signal and a chrominance (C) signal from R, G, and B image data, a process of adjusting luminance and chrominance, a knee correction process, and a gamma correction process.

In some cases, the camera signal processing section 13 further performs, for example, a resolution conversion process and a codec process of encoding for recording or communication in order to convert image data to a final output format. Image data converted to the final output format is transferred to the recording control section 14 and the output section 16. Moreover, the image data is outputted to the display section 15, so that an image is displayed on the display panel 41 and the viewfinder 42.

The camera signal processing section 13 additionally performs an image plane phase difference detection process for AF control. It is known, as a method of detecting an in-focus state, that one pixel for forming an image in the imaging element 12 may be handled as photodiode (hereinafter may be referred to as the "PD") split pixels. The PD split pixels are configured such that a pair of PD pixels are separately disposed on the left and right sides. The image plane phase difference detection process is performed to detect a phase difference from the output values of the left and right PD pixels of the PD split pixels disposed in the imaging element 12. It should be noted that a pair of left and right metal shading pixels may be used instead of the PD split pixels, in some cases.

The recording control section 14 performs recording and reproduction on a recording medium including, for example, a non-volatile memory. For example, the recording control section 14 performs a process of recording image files and thumbnail images, such as moving image data and still image data, on a recording medium.

In practice, the recording control section 14 may be configured in various manners. For example, the recording control section 14 may be configured as a set of a flash memory built in the imaging apparatus 100 and a write/read circuit for the flash memory, or may be configured as a card recording/reproducing section that gains recording/reproducing access to a recording medium detachable from the imaging apparatus 100, such as a memory card (e.g., a portable flash memory). Alternatively, the recording control section 14 may be implemented, for example, by an HDD (Hard Disk Drive) built in the imaging apparatus 100.

The display section 15 is a display section that displays various types of information to a camera operator. Specifically, the display section 15 includes the display panel 41 and the viewfinder 42, which are depicted in FIG. 2.

The display section 15 displays various types of information on a display screen according to instructions from the camera control section 30. For example, the display section 15 displays an image reproduced from image data read from a recording medium in the recording control section 14. Further, the image data of a captured image which is derived from resolution conversion for display purposes in the camera signal processing section 13 is supplied to the display section 15. Thus, the display section 15 displays an image based on the image data of the captured image according to the instructions from the camera control section 30. That is, the display section 15 displays a through image.

Moreover, according to the instructions from the camera control section 30, the display section 15 causes a screen to display, for example, various operation menus, icons, and messages, that is, functions as a GUI (Graphical User Interface).

The output section 16 establishes wired or wireless data communication and network communication with external equipment. For example, the output section 16 transmits captured image data (still image files and moving image files) to an external display apparatus, recording apparatus, reproducing apparatus, and information processing apparatus.

Further, the output section 16 may be handled as a network communication section in order, for example, to establish communication over various networks, such as the Internet, a home network, or a LAN (Local Area Network), and transmit and receive various types of data to and from a server or a terminal on a network.

The operating section 17 collectively includes input devices that allow the user to perform various operation inputs. More specifically, the operating section 17 includes the various operating elements 43 (e.g., the custom buttons 43C1 and 43C2 and the cross key 43J), which are mounted on the main body housing 101, and a detection circuit of the operating elements 43. The operating section 17 detects a user operation, so that a signal corresponding to the operation inputted by the user is sent to the camera control section 30.

The operating section 17 is not implemented only by the operating elements 43, and may be implemented by a touch panel. For example, the touch panel may be formed on the display panel 41, so that, for example, icons and menus displayed on the display panel 41 are used to operate the touch panel and perform various operations.

Alternatively, the operating section 17 may be configured to detect, for instance, a tap operation of the user through the use, for example, of a touchpad.

Further, the operating section 17 may be configured as a receiving section of external operating equipment such as a separate remote controller.

The camera control section 30 includes a microcomputer (arithmetic processing unit) having a CPU (Central Processing Unit).

The memory section 33 stores, for example, information that is used for processing by the camera control section 30. The memory section 33 depicted in FIG. 3 collectively includes, for example, a ROM (Read Only Memory), a RAM (Random Access Memory), and a flash memory.

The RAM in the memory section 33, which functions as a work area for allowing the CPU in the camera control section 30 to perform various data processes, is used to temporarily store, for example, a program and data. The ROM and flash memory (non-volatile memory) in the memory section 33 are used to store, for example, an OS (Operating System) for enabling the CPU to control various sections, content files such as image files, an application program for various operations, and firmware.

The memory section 33 may be a memory area built in a microcomputer chip functioning as the camera control section, or may be formed by a separate memory chip.

The camera control section 30 provides overall control of the imaging apparatus 100 and the lens barrel 102 by executing the program stored in the ROM and flash memory of the memory section 33.

For instance, the camera control section 30 provides control of the operations of various sections, as needed, for example, by controlling the shutter speed of the imaging element 12, issuing instructions for various signal processes in the camera signal processing section 13, controlling imaging and recording operations according to user operations, controlling reproducing operations on recorded image files, and controlling user interface operations. As regards the lens system 21, the camera control section 30 provides, for example, zoom lens control, f-number change control based on user's setting operations, and auto-iris control for automatically controlling the f-number.

In the present embodiment, for example, a software program causes the camera control section 30 to function as an AF processing section 31 and as an AF range control section 32.

The AF processing section 31 provides AF control to automatically focus on a target subject. More specifically, the AF processing section 31 performs an AF operation by controlling drive of the focus lens in the lens system 21 through the lens barrel control section 23 according to a defocus amount calculated by the camera signal processing section 13.

When instructions for performing the AF operation are issued by the user, the AF processing section 31 provides the above-described AF control over a subject that is set as a focusing target. Accordingly, the in-focus state with respect to the subject set as the focusing target is maintained.

Further, as what is generally called tracking AF, the AF processing section 31 additionally performs a process of maintaining the in-focus state while tracking a specific subject. Hence, the AF processing section 31 occasionally performs a subject recognition process by making image analysis. For instance, the AF processing section 31 successively performs such processes as a face recognition process or an object recognition process by use of semantic segmentation techniques, for example to determine the subject. By recognizing the subject at one frame or intermittent frame intervals of a captured image, the AF processing section 31 is able to confirm the position of the subject in an image plane and perform a tracking AF process.

The AF range control section 32 provides setup and control of the AF range control function.

The AF range control function provides AF control over a subject within a distance range that is set in the depth direction as mentioned earlier. Therefore, the AF range control section 32 performs an AF range setting process. More specifically, the AF range control section 32 sets the limit points of the AF range, namely, a near end distance and a far end distance.

The AF range may be set by using a certain fixed AF range or by allowing the user to select one of multiple predefined AF range settings. Alternatively, the AF range control section 32 may perform a process of automatically setting or selecting an appropriate AF range based, for example, on the result of imaging situation sensing, a subject type, or a scene type.

Further, the AF range control section 32 may perform AF range setup according to user-inputted distance values indicating the near and far ends.

Furthermore, the AF range control section 32 may perform AF range setup by automatically setting the distance values, which indicate the near and far ends, according to the description of the subject, the scene type, and information regarding a subject distance (e.g., a later-described depth map).

Moreover, the AF range control section 32 turns on or off the AF range control function according to a user operation.

Additionally, when the AF range control function is on, the AF range control section 32 causes the AF processing section 31 to provide AF control over a subject within a set AF range. More specifically, when the AF range control function is turned on, the AF range control section 32 supplies the set AF range to the AF processing section 31, and allows the AF processing section 31 to set a subject as a target within the set AF range.

In some cases, the AF range control section 32 changes the AF range while AF control is executed by the AF processing section 31.

It should be noted that, in a case where distance information regarding the subject is used for AF control or AF range setup, the AF processing section 31 and the AF range control section 32 occasionally perform the subject recognition process as described earlier.

Consequently, the camera control section 30 is also able to generate, for example, depth map information with respect to an image, and determine the distance to each subject. The depth map includes data indicating the distance of a subject at each pixel from the imaging apparatus 100. For example, the depth map indicating the distribution of the subject distance is obtained by converting the defocus amount calculated by the camera signal processing section 13 to the subject distance according to optical system and imaging element conditions. The distance to each subject can be determined when the above-described depth map is generated so as to cover a required range, such as the whole area of an image or a later-described AF area frame 50.

Further, the depth map may have the distance information regarding only a region, such as a face, a body, an animal, or an object which is obtained by such processes as the face recognition process or the object recognition process, for example, instead of the whole captured image or the whole of the AF area frame 50, and have no distance information regarding, for example, a background.

The present embodiment may be configured such that the distance information regarding at least a subject that can be an AF target can be determined. In this regard, the depth map need not always be in the form of what is generally called a depth map, and may be formed so as to determine the distance information regarding a subject that can be as a significant AF target, such as a human, a face, an eye, a body, an object, or an animal in a captured image.

The sensor section 18 collectively includes various sensors mounted on the imaging apparatus.

In a case where, for example, an IMU (inertial measurement unit) is mounted as the sensor section 18, angular velocity can be detected by an angular velocity (gyro) sensor having three axes, namely, pitch, yaw, and roll, and acceleration can be detected by an acceleration sensor.

Further, in some cases, for example, a location information sensor, an illuminance sensor, a ranging sensor, or the like may be mounted as the sensor section 18. For example, on the basis of a value detected by the ranging sensor of a TOF (Time of Flight) type, the camera control section 30 may generate the above-described depth map or the distance information regarding each subject, thereby enabling determination of the distance and front-rear positional relation between the subjects.

In a state where the lens barrel 102 is mounted on the main body housing 101, the camera control section 30 communicates with the lens barrel control section 23 to issue various instructions.

In the lens barrel 102, the lens barrel control section 23 having, for example, a microcomputer is mounted and able to establish data communication with the camera control section 30 and transmit and receive various kinds of data to and from the camera control section 30. For instance, the camera control section 30 issues drive instructions to instruct the lens barrel control section 23 to drive, for example, the zoom lens, the focus lens, and the aperture mechanism. According to such drive instructions, the lens barrel control section 23 controls the lens system drive section 22 to execute the operation of the lens system 21.

The lens system drive section 22 includes, for example, a motor driver for a zoom lens drive motor, a motor driver for a focus lens drive motor, a motor driver for an aperture mechanism motor, and the like.

According to instructions from the lens barrel control section 23, the above-mentioned motor drivers apply a drive current to the respective corresponding drivers, to thereby move the focus lens and the zoom lens and open or close aperture blades of the aperture mechanism, and the like.

It should be noted that the internal configuration of the imaging apparatus 100 depicted in FIG. 3 allows the lens barrel 102 to be separately detachable from the main body housing 101. However, even in a case where the imaging apparatus 100 is of a lens-integrated type, the imaging apparatus 100 has an almost similar internal configuration. In that case, however, the camera control section 30 occasionally has the control function of the lens barrel control section 23.

2. AF Range Control Function

The AF range control function according to the present embodiment will now be described.

Figure 4:
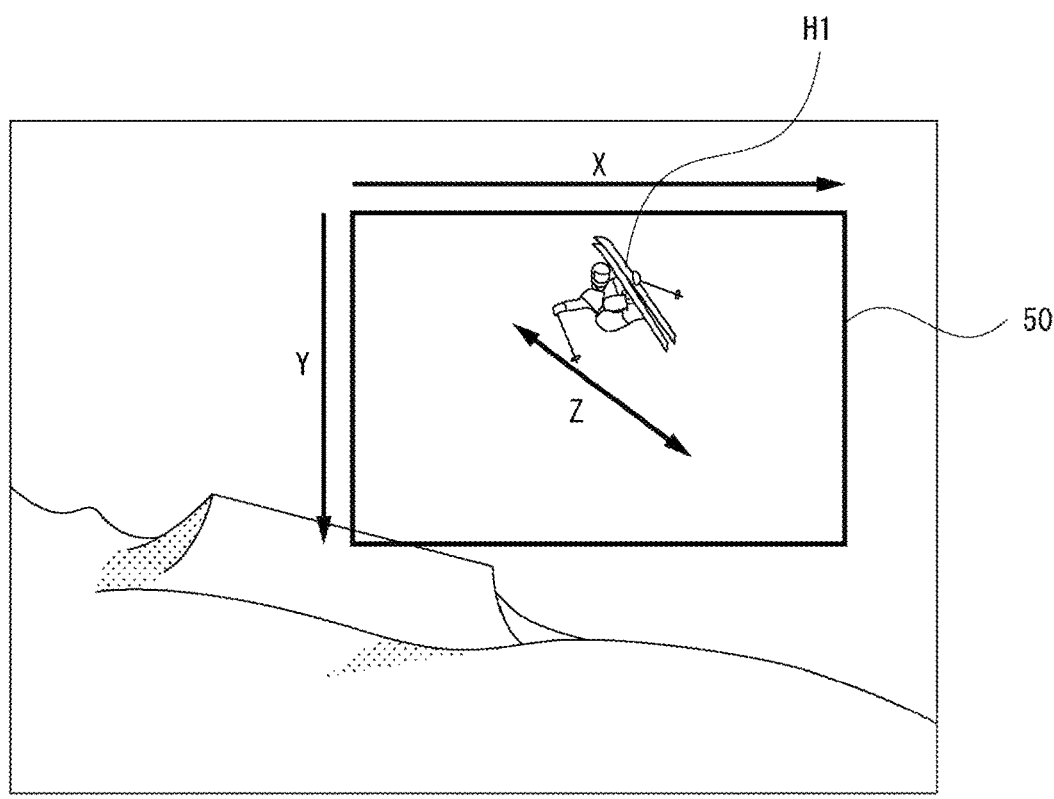
FIG. 4 is an explanatory diagram illustrating an AF range according to the embodiments.

FIG. 4 illustrates the AF range of the AF range control function. It is assumed that the Z-direction represents the direction of depth (depth direction) as viewed from the imaging apparatus 100 while the X- and Y-directions respectively represent the horizontal direction and the vertical direction in a plane of a captured image.

The range indicated by an arrow in the Z-direction is regarded as the AF range of the AF range control function.

In AF control, such a control that a subject within the AF range is set as a target and put into an in-focus state is to be executed. It should be noted that the AF range may be set to have a limitation of the range in the Z-direction only. Alternatively, however, the AF range may be set to limit the in-plane direction of an image and thus define the AF area frame 50, which is indicated in the X- and Y-directions depicted in FIG. 4.

In a case where the AF range is to be set only in the Z-direction, AF control is executed over a subject appearing in the screen whose distance from the imaging apparatus 100 is included within the range from the near and far ends of the AF range in the Z-direction, as a target.

For example, in a situation depicted in FIG. 4, an attempt is made to capture an image of a scene in which a player regarded as a target subject jumps out of a jump position, in shooting of ski competition.

When the AF range is set for the above-described case, it is easy to perform the AF operation for focusing on a player who suddenly appears within a predetermined distance range. That is, it is effective to use the AF range control function in order to limit the AF range within a zone into which the subject comes.

However, if the target subject moves out of the AF range after being automatically focused by using an AF function, the above-described AF range control function is unable to perform tracking of the AF control. Therefore, in some cases, the target subject may go out of focus.

In order to address the above problem, it is assumed that, in a case where the AF range is set by using the AF range control function, the present embodiment is configured to change the AF range after focusing is achieved.

Figure 5:
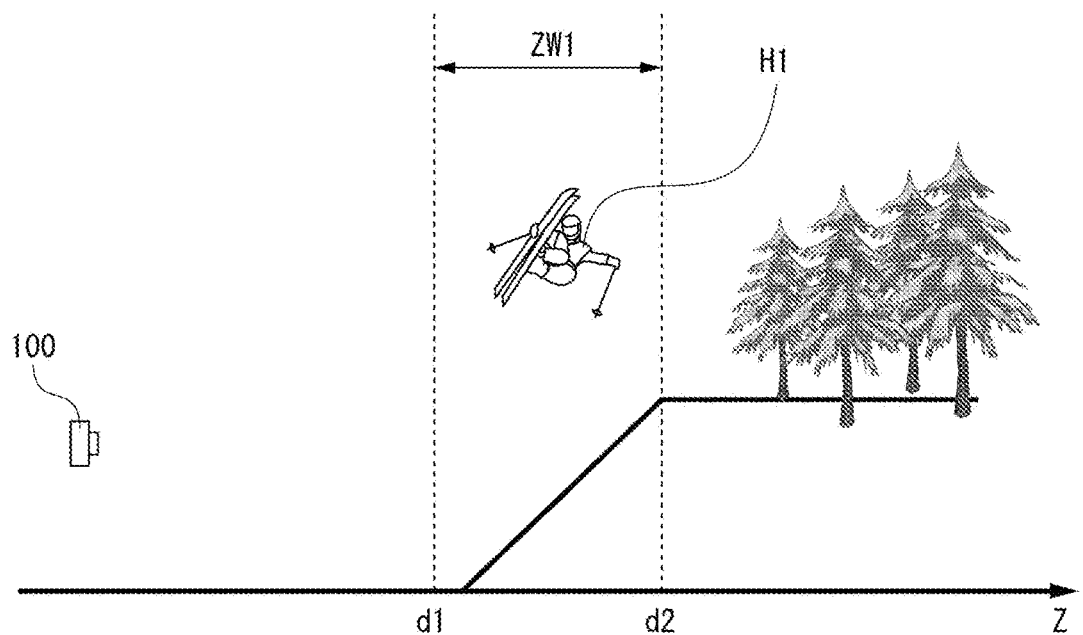
FIG. 5 depicts a set of explanatory diagrams illustrating an AF range control function according to the embodiments.
Figure 5:
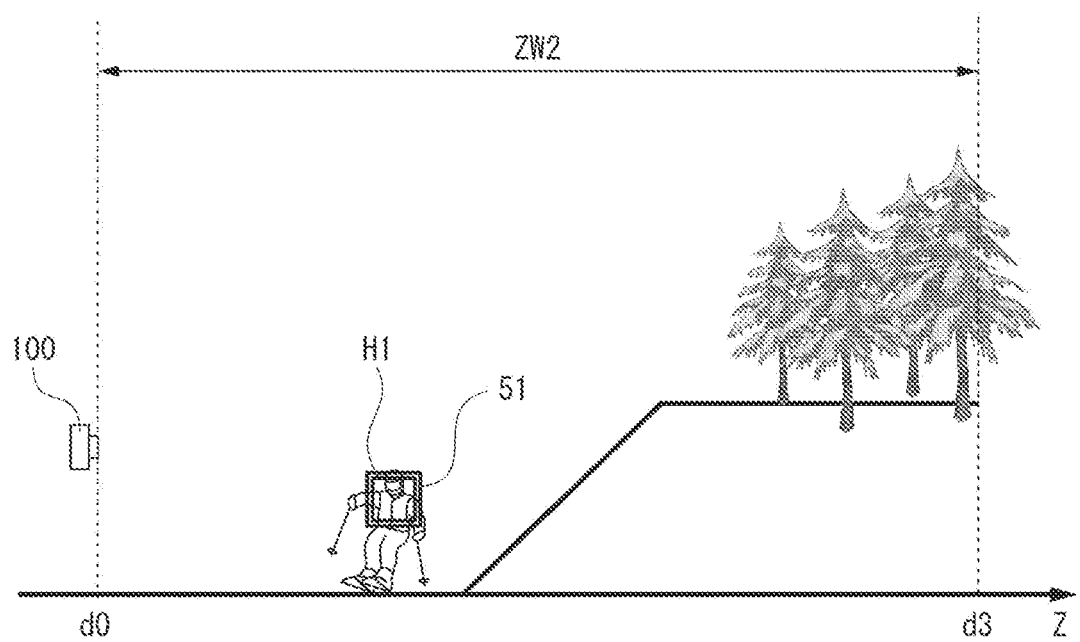

FIG. 5A illustrates a state where the AF range is assumed to be a distance range ZW1 between a near end d1 and a far end d2 as viewed from the imaging apparatus 100.

For example, when the AF range control function is turned on, the camera control section 30 searches the AF range, that is, the distance range ZW1, for a subject serving as the AF target. Subsequently, when a subject H1, such as a ski player, appears within the AF range, that is, the distance range ZW1, the camera control section 30 provides focus control over the subject H1.

After the subject H1 is focused, the camera control section 30 changes the AF range, for example, to a distance range ZW2 between a near end do and a far end d3 that are depicted in FIG. 5B. For example, the near end do is set at a distance of 0 m from the imaging apparatus 100, and the far end d3 is set at a position far away from the far end d2.

It should be noted that a focus frame 51 indicating the AF focusing target is displayed for the subject H1.

When the AF range is changed in the above-described manner, the AF operation is continuously performed in such a manner to track the target subject.

If the distance range ZW1 is continuously used as the AF range even in a situation where the player regarded as the subject H1 is captured as the AF target, the subject H1 is no longer treated as the AF target when the subject H1 subsequently moves out of the AF range. However, when the AF range is extended to the distance range ZW2 after focusing is achieved, the subject H1 can continuously be captured as the AF target by tracking the movement of the subject H1.

Figure 6:
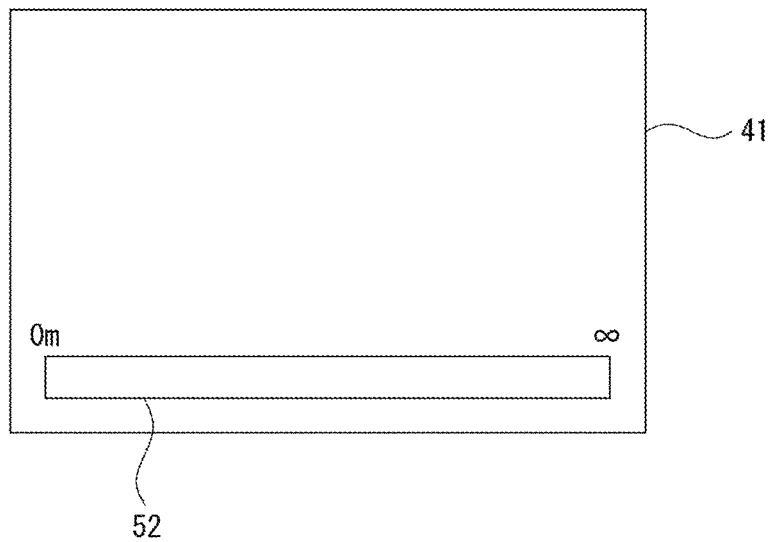
FIG. 6 depicts a set of explanatory diagrams illustrating the settings of the AF range according to the embodiments.
Figure 6:
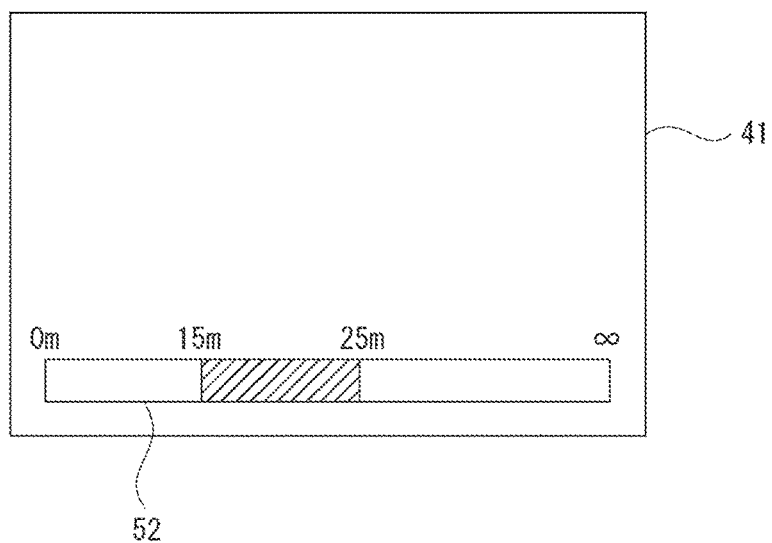
Figure 6:
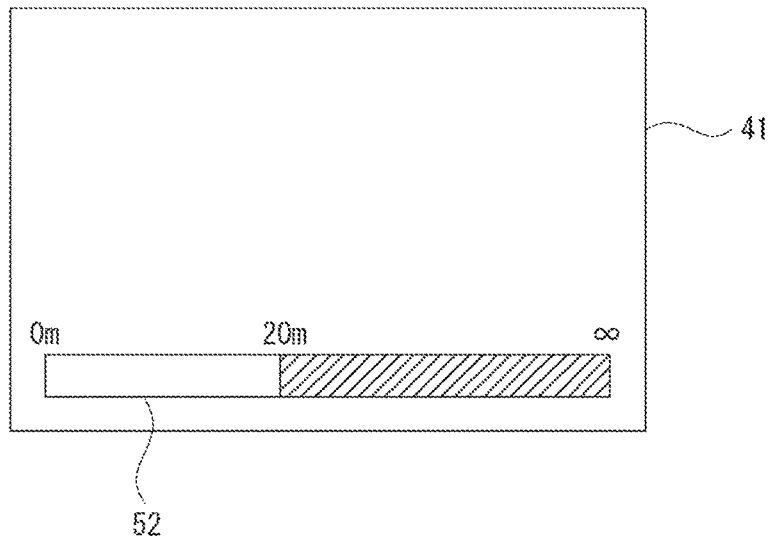

FIG. 6A, FIG. 6B, and FIG. 6C illustrate examples in which the AF range is selected or set as desired by the user.

FIG. 6A illustrates the display panel 41 in a state where a range setup bar 52 is displayed. In the depicted example, the range setup bar 52 indicates, for example, a distance of 0 m to infinity, in the form of a bar, as the value of distance (depth value) in the depth direction of the imaging apparatus 100.

For example, when the user performs a predetermined operation on the range setup bar 52 in order to specify the positions corresponding to the near and far ends, the AF range is set as indicated, for example, by shaded portions in FIG. 6B and FIG. 6C.

In the example of FIG. 6B, the near end is set at a distance of 15 m, and the far end is set at a distance of 25 m.

In the example of FIG. 6C, the near end is set at a distance of 20 m, and the far end is set at a distance of infinity.

Further, some of the above-mentioned AF ranges may be displayed in list form or selectively displayed on the display panel 41 to prompt the user to make a selection.

For example, when the user turns on the AF range control function after AF range setup, the imaging apparatus 100 performs the AF operation to search the AF range described in FIG. 5B for a target.

Furthermore, the user may perform post-focusing AF range setup depicted in FIG. 5B. For example, a desired distance range can be set as a post-focusing AF range as depicted in FIG. 6B and FIG. 6C.

Alternatively, the post-focusing AF range may be automatically set by the camera control section 30, for example, as a somewhat wide range or a full range. For example, what is called the full range is set by setting the near end at a distance of 0 m and setting the far end at a distance of infinity. It should be noted that the full range substantially disables the AF range control function. However, AF range change according to the present disclosure includes changing the AF range to the full range.

It should be noted that, in a case where the AF range is changed upon focusing as described above, the user should preferably be able to recognize the change in the AF range.

For example, even in a case where the AF operation is performed by using the AF range control function, the range setup bar 52 should preferably be displayed as depicted in FIG. 6A, FIG. 6B, and FIG. 6C. Therefore, it is conceivable that, when the AF range (shaded portion) changes as indicated by the displayed range setup bar 52, the user is able to recognize the change in the AF range.

Further, by displaying a message, changing an icon display mode, displaying the focus frame 51, or the like, the user may be enabled to recognize a change in the AF range.

Moreover, in a case where the AF range is changed to the full range, the range setup bar 52 may be deleted to enable the user to recognize such a change in the AF range.

Incidentally, the AF range may be limited in the in-plane direction as depicted in FIG. 4. More specifically, the fact that a subject is not only within the distance range but also within the AF area frame 50 is defined as an additional condition for being the AF target.

For example, in the case depicted in FIG. 4, when the AF range is set as a range that is defined not only in the Z-direction but also by the AF area frame 50 in the X- and Y-directions, the AF target is selected from within the range limited in the X-, Y-, and Z-directions.

The AF area frame 50, which is the AF range in the in-plane direction, can be set as desired by the user. Alternatively, the AF area frame 50 may be fixed or automatically changed.

Figure 7:
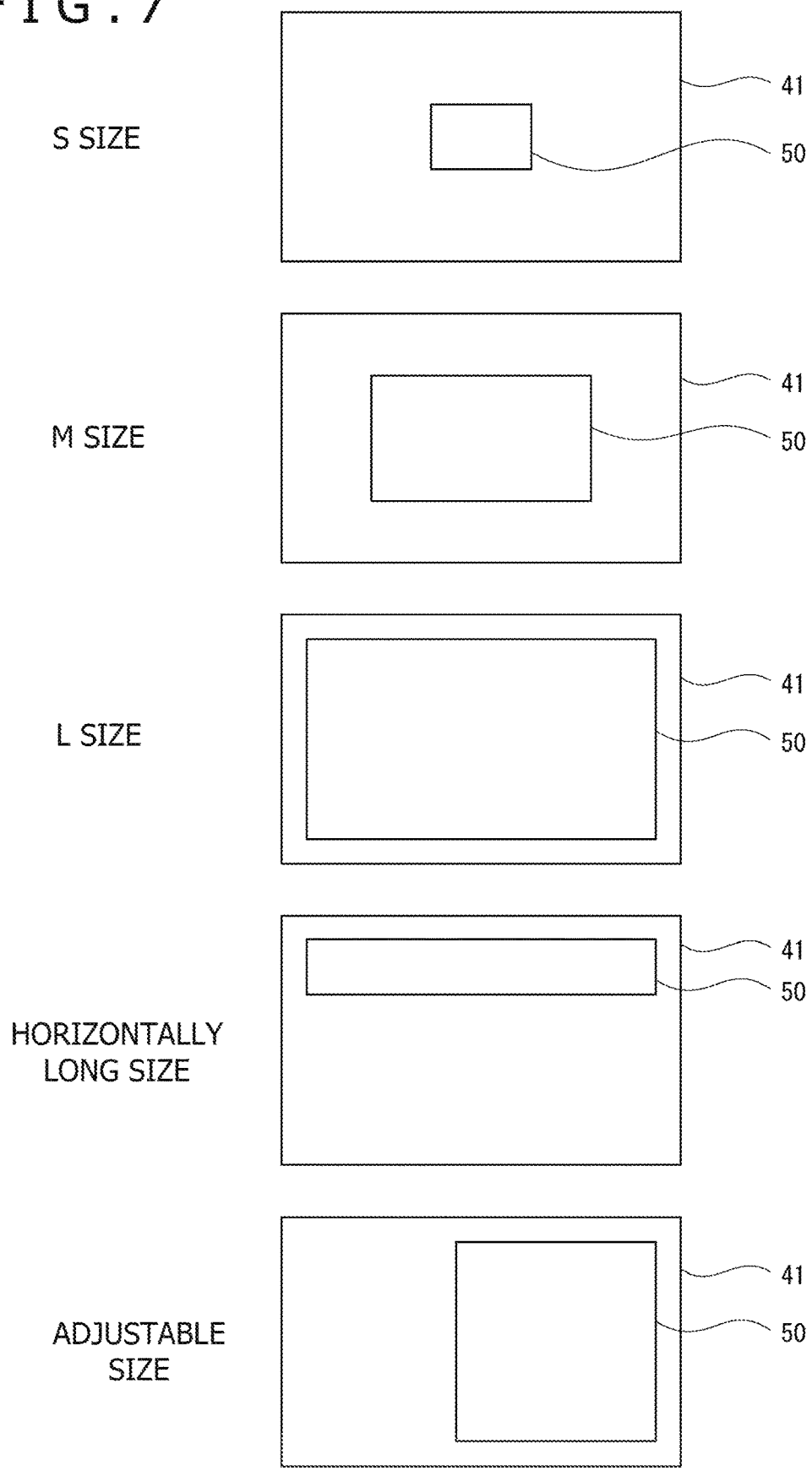
FIG. 7 depicts a set of explanatory diagrams illustrating in-plane settings of the AF range according to the embodiments.

For example, FIG. 7 illustrates various types of the AF area frame 50.

As depicted in the examples of FIG. 7, for instance, an S size, an M size, an L size, a horizontally long size, and an adjustable size are selectable as the AF area frame 50. The user may select an appropriate AF area frame 50 suitable for a scene where an image is captured, or may select, for example, the adjustable size and perform a range definition operation to set a desired region as the AF area frame 50.

Further, even in a case where no selection is made by the user, the camera control section 30 may use a face recognition or object recognition technique to automatically set an appropriate AF area.

3. First Embodiment

A first embodiment of the present technology will now be described.

Figure 8:
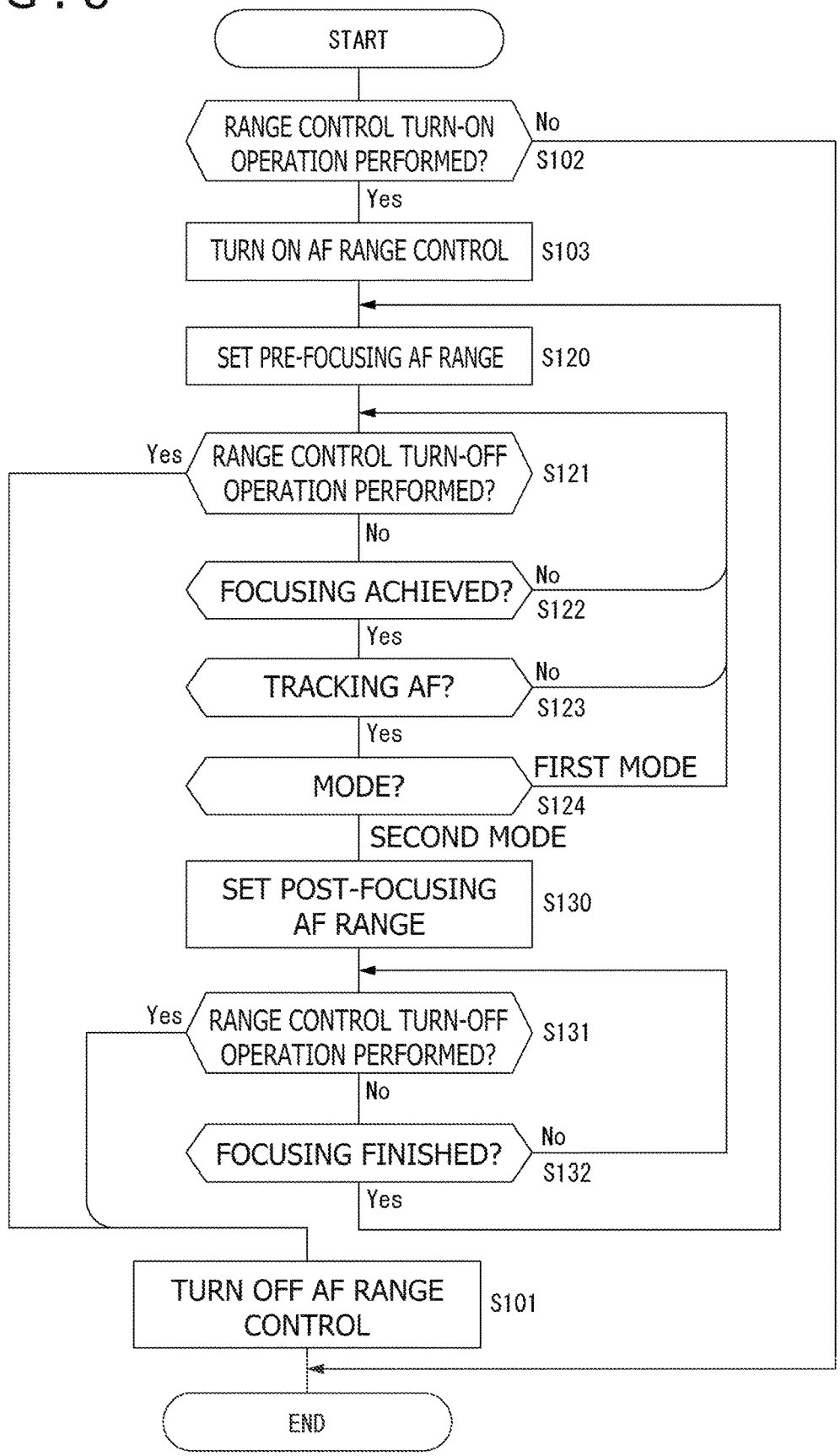
FIG. 8 is a flowchart illustrating an AF range control process according to a first embodiment of the present technology.

FIG. 8 illustrates processes regarding the AF range control function of the camera control section 30, which is executed by the functions of the AF processing section 31 and AF range control section 32 according to the first embodiment.

In step S102 of FIG. 8, while the AF range control function is off, the camera control section 30 monitors a range control turn-on operation by the user. While the range control turn-on operation is not detected, the camera control section 30 keeps the AF range control function in the off state. However, when the range control turn-on operation is detected, the camera control section 30 proceeds to step S103.

The range control turn-on operation (hereinafter simply referred to also as the "turn-on operation") is an operation performed to turn on the AF range control function. Let us now assume that, for example, the custom button 43C1 is assigned as an operating element for the turn-on operation. The custom button 43C1 may be assigned, by default, as the operating element for the turn-on operation. Alternatively, the custom button 43C1 may be assigned, by a user's setup operation, as the operating element for the turn-on operation.

In the present embodiment, it is assumed that a later-described range control turn-off operation (hereinafter simply referred to also as the "turn-off operation") is an operation performed by the same operating element as for the turn-on operation. For example, the custom button 43C1 functions as an operating element for the turn-on operation and the turn-off operation. That is, the custom button 43C1 operates in a toggling manner so as to perform the turn-on operation while the AF range control function is off and perform the turn-off operation while the AF range control function is on.

In step S102, for example, the camera control section 30 monitors a one-push operation of the custom button 43C1.

It should be noted that the custom button 43C2 may be used, instead of the custom button 43C1, to perform the turn-on operation and the turn-off operation. Obviously, another operating element may be used to perform the turn-on operation and the turn-off operation. Alternatively, an on-screen icon of the display panel 41 may be tapped to perform the same operations.

Further, the turn-on operation and the turn-off operation may be assigned to other operating elements, such as the custom button 43C1 and the custom button 43C2.

Furthermore, the turn-on operation and the turn-off operation may be made available as menu options so as to enable the user to select one of hierarchical items displayed on a menu screen by using, for example, the cross key 43J and thus perform a desired operation.

When the turn-on operation is detected in step S102, the camera control section 30 proceeds to step S103, turns on the AF range control function, proceeds to step S120, and performs pre-focusing AF range setup. The AF range to be applied at the beginning of AF range control function execution is set as the above-described user-defined AF range or as the automatically set AF range.

Figure 9:
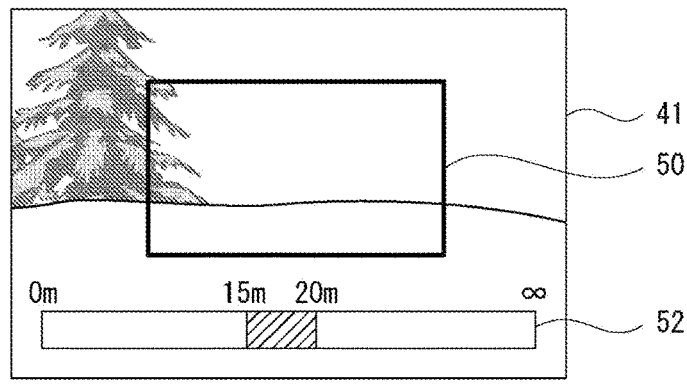
FIG. 9 depicts a set of explanatory diagrams illustrating changes in the AF range according to the embodiments.
Figure 9:
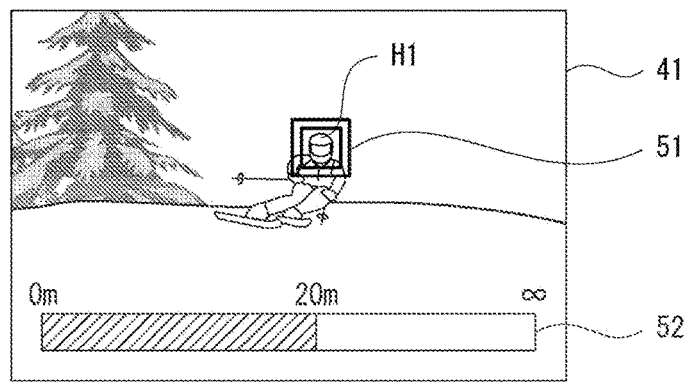
Figure 9:
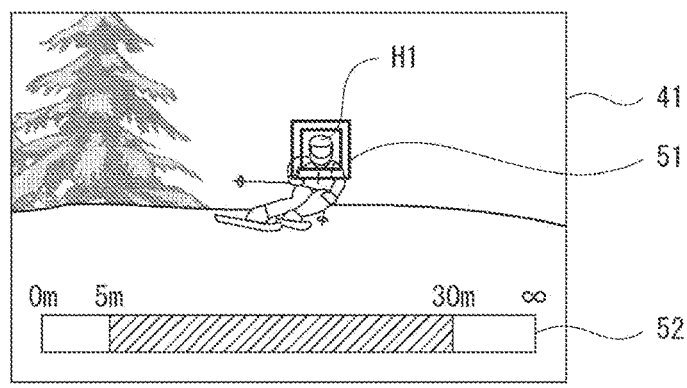
Figure 9:
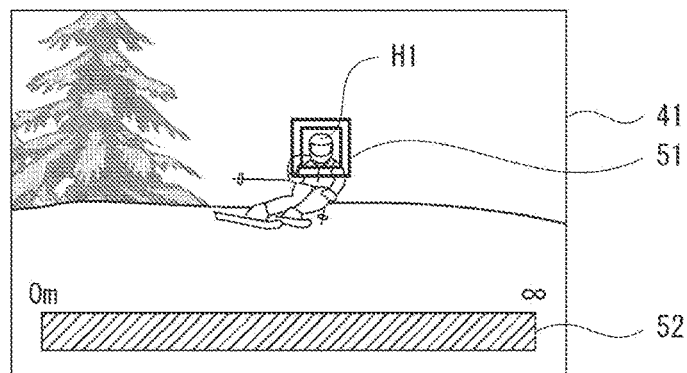

For example, FIG. 9A illustrates an example display that is presented before a specific subject is focused while AF control is being executed and the distance range between the near end at a distance of 15 m and the far end at a distance of 20 m is set as the initial AF range.

It should be noted that, in the above instance, the range setup bar 52 is assumed to be displayed, for example, on the display panel 41 by turning on the AF range control function. However, the range setup bar 52 need not necessarily be displayed. Further, although the AF area frame 50 is displayed, it is conceivable that the AF area frame 50 may not be displayed in a case, for example, where the AF range is not limited in the in-plane direction.

While the AF range control function is on, a process is performed according to the AF range control function when the user performs an operation to execute the AF operation.

The camera control section 30 performs AF processing accordingly when, for example, the user half-presses a shutter button. The AF processing to be performed includes, for example, an object recognition process performed on a subject, a search process of searching for a focusing target subject, and an AF control process of driving the focus lens on the basis of the defocus amount detected in the region of the focusing target subject.

When performing the AF processing while the AF range control function is on, the camera control section 30 determines the focusing target subject within the AF range set by the AF range control function, and performs a process of focusing on the determined focusing target subject.

After the AF range control function is turned on, the camera control section 30 monitors the turn-off operation in step S121 as a process related to the AF range control function, and then in step S122, monitors whether focusing is achieved.

When the turn-off operation is detected after the AF range control function is turned on, the camera control section 30 turns off the AF range control function in step S101.

In a case where the in-focus state of a certain subject is detected by the AF processing that is performed while the AF range control function is on, the camera control section 30 proceeds from step S122 to step S123. In step S123, the camera control section 30 branches the processing, depending on whether or not the AF operation is being performed as a tracking AF operation. The tracking AF operation is an AF operation mode that is used to continuously perform the AF operation while tracking a target subject. An AF operation different from the tracking AF operation is an AF operation mode that is used to perform the AF processing on a subject within the AF range without tracking any specific subject.

In a case where the currently performed AF operation is in an AF operation mode in which the tracking AF is not performed, the camera control section 30 returns from step S123 to step S121. That is, when the currently performed AF operation is not the tracking AF operation, the camera control section 30 does not change the AF range before and after focusing is achieved. In the example of FIG. 8, it is assumed that the camera control section 30 proceeds from step S123 to step S124 only in the case of tracking AF operation.

In step S124, the camera control section 30 branches the processing, depending on whether a first mode or a second mode is selected for the AF range control function.

In the first mode, the AF range settings remain unchanged even after a subject is focused under AF control.

In the second mode, the AF range settings change after the subject is focused under AF control.

The first mode and the second mode can be selected as desired by the user.

The first mode and the second mode may be selectable menu items displayed on the menu screen or may be assigned to specific operating elements. The following description is given on the assumption that the custom button 43C2 is assigned as a mode switching operating element. For example, the custom button 43C2 may be assigned, by default, as the operating element for a mode switching operation. Alternatively, the custom button 43C1 may be assigned, by a user's setup operation, as the operating element for the mode switching operation. Obviously, the assignment of the mode switching operation to the custom button 43C2 is merely an example. The mode switching operation may be assigned to another operating element.

Further, for example, the custom button 43C2 operates in a toggling manner so as to perform the mode switching operation.

Figure 10:
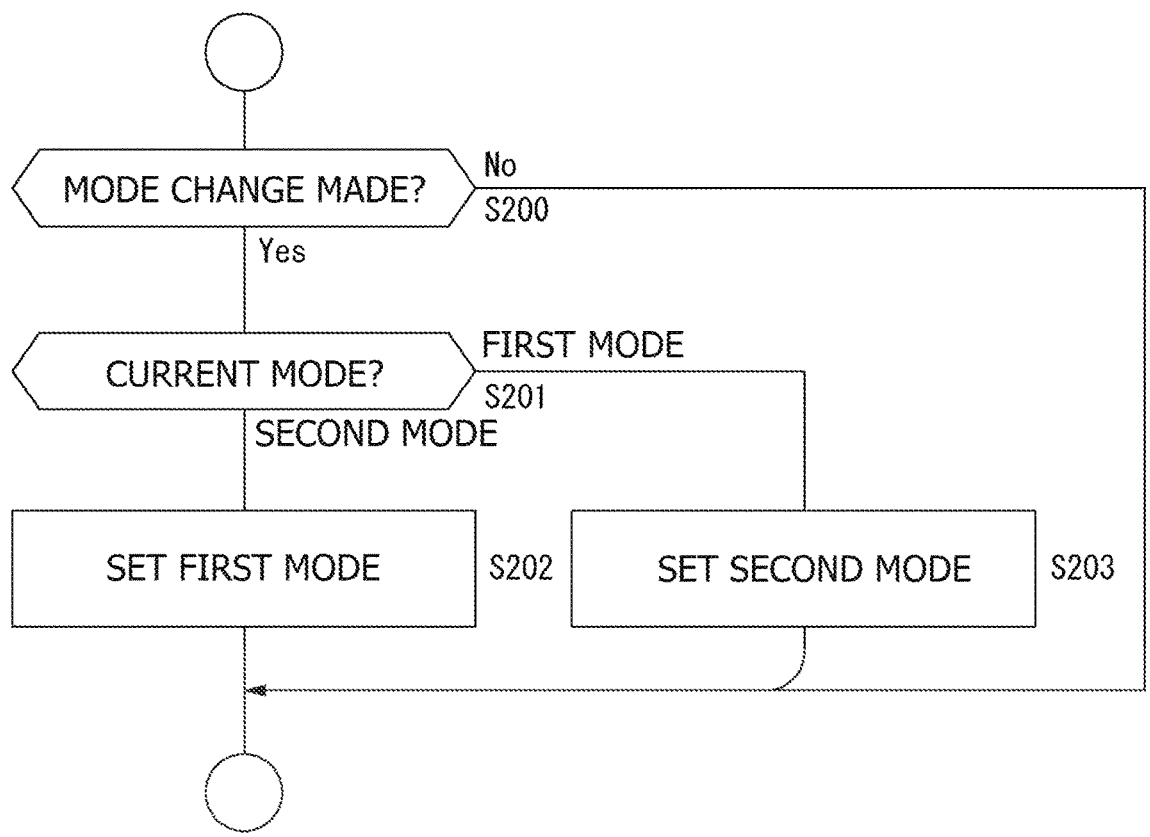
FIG. 10 is a flowchart illustrating a mode switching process according to the embodiments.

FIG. 10 illustrates an example of a process that is performed by the camera control section 30 (AF range control section 32) according to the mode switching operation. The process depicted in FIG. 10 is performed no matter whether the AF range control function is on or off.

In step S200, the camera control section 30 successively monitors a one-push operation of the custom button 43C2.

In a case where the one-push operation of the custom button 43C2 is detected, the camera control section 30 proceeds to step S201 and determines whether the first mode or the second mode is currently selected. Then, if the second mode is currently selected, the camera control section 30 proceeds to step S202 and switches to the first mode. Meanwhile, if the first mode is currently selected, the camera control section 30 proceeds to step S203 and switches to the second mode.

As described above, the mode switching operation can be performed in a toggling manner. This makes it easy for the user to select the first mode or the second mode, depending on the situation.

It should be noted that, in some cases, the user does not frequently switch between the first mode and the second mode. In such cases, user-friendliness can also be provided according to the user's circumstances. For example, the custom button 43C2 may be assigned to another operation, so that the mode switching operation is selectable from the menu.

In a case where the first mode is selected in step S124 of FIG. 8, the camera control section 30 returns to step S121. That is, in the first mode, the camera control section 30 does not change the AF range before and after focusing is achieved. Meanwhile, in the second mode, the camera control section 30 proceeds from step S124 to step S130.

In the example of FIG. 8, therefore, in a case where focusing is achieved by the AF operation while the AF range control function is on, the processing in step S130 is performed when the tracking AF operation is performed as the AF operation with the second mode selected.

In step S130, the camera control section 30 performs a setting change process of changing the AF range to the post-focusing AF range.

For example, FIG. 9B depicts an example display that is presented in a state where the distance range between the near end at a distance of 0 m and the far end at a distance of 20 m is set as the post-focusing AF range. Since the tracking AF is being performed with respect to the subject H1, the focus frame 51 is displayed superimposed over the subject H1.

It should be noted that the situation where pre-focusing and post-focusing AF ranges are set as depicted in FIG. 9A and FIG. 9B is merely an example. The distance range varies, for example, with user setup and automatic setup.

For example, FIG. 9C depicts an example display that is presented in a case where the AF range depicted in FIG. 9A is changed, after focusing, to the distance range between the near end at a distance of 5 m and the far end at a distance of 30 m.

Further, FIG. 9D depicts an example display that is presented in a case where the AF range depicted in FIG. 9A is changed, after focusing, to the distance range between the near end at a distance of 0 m and the far end at a distance of infinity.

In a case where the post-focusing AF range is set in step S130 of FIG. 8, the camera control section 30 monitors the range control turn-off operation in step S131, and then monitors the finish of focusing in step S132.

Even if the tracking AF is continuously performed within the post-focusing AF range, an out-of-focus state may occur because, for example, the subject may suddenly move out of focus or out of frame. Further, the tracking AF may be finished by a user operation.

When, as described above, the in-focus state cannot be maintained or focusing is finished, the camera control section 30 proceeds from step S132 to step S120, and returns the AF range to the pre-focusing AF range settings. Subsequently, the camera control section 30 performs a monitoring process in the earlier-described steps S121 and S122.

Moreover, in a case, for example, where the turn-off operation is detected, in step S131, as the operation of the custom button 43C1, the camera control section 30 turns off the AF range control function in step S101. This prevents the AF operation from being performed with the AF range limited.

In a case where the process depicted in FIG. 8 is performed to turn on the AF range control function with the second mode selected, at the time of tracking AF, a target subject is initially searched for at the pre-focusing AF range settings, and then the AF range settings are changed after focusing is achieved. For example, the near or far end of the AF range or both the near and far ends of the AF range are changed.

Especially, the change is made to extend the AF range as depicted in the earlier examples of FIG. 9B, and FIG. 9C, and FIG. 9D.

Consequently, the AF range is initially limited. This not only makes it easy to implement an AF operation with a desired subject selected as the target, but also makes it possible to track the desired subject beyond the initial AF range after focusing is achieved.

Accordingly, as for the subject moving toward the imaging apparatus 100 after focusing, it is preferable that the AF range settings be changed to extend the AF range toward the near end after focusing.

Further, as for the subject moving far away after focusing, it is preferable that the AF range settings be changed to extend the AF range toward the far end after focusing.

It should be noted that the near and far ends may be changed while the distance range is left unchanged at the same 10 m without extending the AF range. For example, the pre-focusing setup, such as the distance range between the near end at a distance of 10 m and the far end at a distance of 20 m, may be changed to the post-focusing setup, such as the distance range between the near end at a distance of 5 m and the far end at a distance of 15 m.

Further, it is conceivable that the AF range in the Z-direction may be narrowed after focusing.

For example, in the case of a subject that makes it necessary to cover a somewhat wide distance range at the time of appearing, but remains at a specific location after appearing, an AF control target does not easily move away from the subject when the AF range is narrowed after focusing. In that sense, it is useful to narrow the AF range after focusing not only at the time of tracking AF operation as depicted in the example of FIG. 8 but also at the time of non-tracking AF operation.

An in-plane AF area in the X- and Y-directions indicated by the AF area frame 50 in FIG. 9A corresponds to the AF range in the X- and Y-directions. This AF area, that is, the AF range in the X- and Y-directions, may be changed after focusing.

Examples of conceivable X- and Y-direction AF range changes are described below. It should be noted that, in the individual examples below, "limiting" denotes limiting the range within an image plane, "easing" a limit denotes extending a limit range, "tightening" the limit denotes narrowing the limit range, and "removing" the limit denotes eliminating the limit. For example, removing the X-direction limit denotes setting the range to the whole angle of view in the horizontal direction.

Before focusing, the AF area is set by limiting the AF range in the X-direction and in the Y-direction. After focusing, however, the AF area is set by easing, removing, or tightening the X-direction limit and easing, removing, or tightening the Y-direction limit.

Before focusing, the AF area is set by limiting the AF range in the X-direction and in the Y-direction. After focusing, however, the AF area is set by maintaining the X-direction limit while easing, removing, or tightening the Y-direction limit.

Before focusing, the AF area is set by limiting the AF range in the X-direction and in the Y-direction. After focusing, however, the AF area is set by easing, removing, or tightening the X-direction limit while maintaining the Y-direction limit.

Before focusing, the AF area is set by limiting the AF range in the X-direction. After focusing, the AF area is set by easing, removing, or tightening the X-direction limit while limiting the AF range in the Y-direction.

Before focusing, the AF area is set by limiting the AF range in the Y-direction. After focusing, the AF area is set by easing, removing, or tightening the Y-direction limit while limiting the AF range in the X-direction.

Before focusing, the AF area is set by limiting the AF range in the X-direction and in the Y-direction. After focusing, however, the X-direction limit range, the Y-direction limit range, or the range limited in both the X- and Y-directions are moved in the in-plane direction.

As regards the above-described AF area, the AF operation suitable for a scene where an image is captured can be performed by changing the AF range settings before and after focusing is achieved.

Incidentally, it is assumed in the example of FIG. 8 that the first mode and the second mode are selectable by the user. This enables the user to execute the AF range control function according to a user's intention. The first mode is suitable for a case where the range of subject movement does not significantly change.

For example, in a situation where the subject merely moves within a predetermined range, it is effective to leave the AF range unchanged while the AF range control function is on. For example, when an image of a combat sport is being captured, players regarded as subjects often remain within the distance range. In such a case, maintaining the AF range makes it possible to avoid erroneously focusing on other persons and objects out of the AF range.

Meanwhile, the distance between the imaging apparatus 100 and, for example, a ski jumper or an alpine skier changes significantly and rapidly. In such a case, when the AF range is narrowed down to some extent before focusing, the AF operation makes it easy to focus on a desired subject (ski player). Subsequently, when, for example, the full range is selected after focusing, the AF operation makes it easy to maintain focus on a player who exhibits significant distance changes. Therefore, the second mode is suitable for this case.

4. Second Embodiment

Examples of processing performed according to a second embodiment of the present technology will now be described with reference to FIG. 11. It should be noted that the processing depicted in FIG. 11 and performed in the same manner as the processing depicted in FIG. 8 are assigned the same step numbers as in FIG. 8 and will not be redundantly described.

Figure 11:
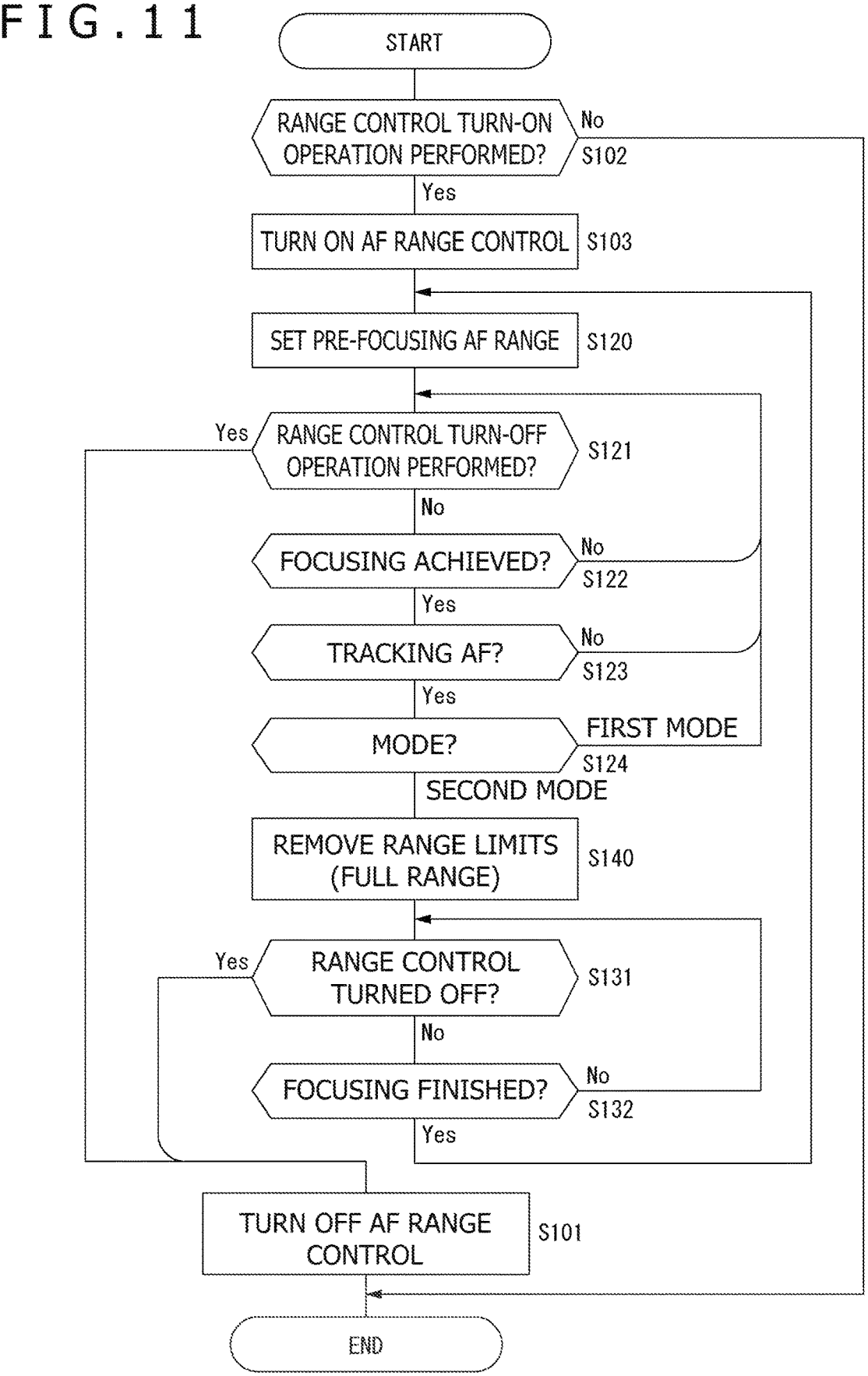
FIG. 11 is a flowchart illustrating the AF range control process according to a second embodiment of the present technology.

In FIG. 11, step S140 is performed in place of step S130 of FIG. 8.

In step S140, processing is performed to change the AF range to the full range after focusing. That is, as depicted in FIG. 9D, the AF range is set by setting the near end at a distance of 0 m and setting the far end at a distance of infinity.

In practice, the above processing may be performed by allowing the AF range control section 32 to instruct the AF processing section 31 to set the AF range by changing the near and far end settings or by disabling the AF range.

Particularly, in a situation where the tracking AF is to be performed on a subject that is already focused on, it is assumed that the AF range is preferably changed to the full range after focusing, in some cases.

Further, setting the AF range to the full range after focusing signifies that the post-focusing AF range need not be set.

For example, even if the product specifications for the imaging apparatus 100 state that the post-focusing AF range is not to be set, the process depicted in FIG. 11 can be adopted.

Moreover, even if the post-focusing AF range is not set by the user in a case, for example, where the product specifications for the imaging apparatus 100 state that the post-focusing AF range can be set by the user, usefulness is also provided when the process depicted in FIG. 11 is executed to set the full range as the post-focusing AF range.

5. Process Performed on Aperture Mechanism

It is conceivable that the aperture mechanism in the lens system 21 is controlled when the AF range control function is executed according to the first or second embodiment.

Figure 12:
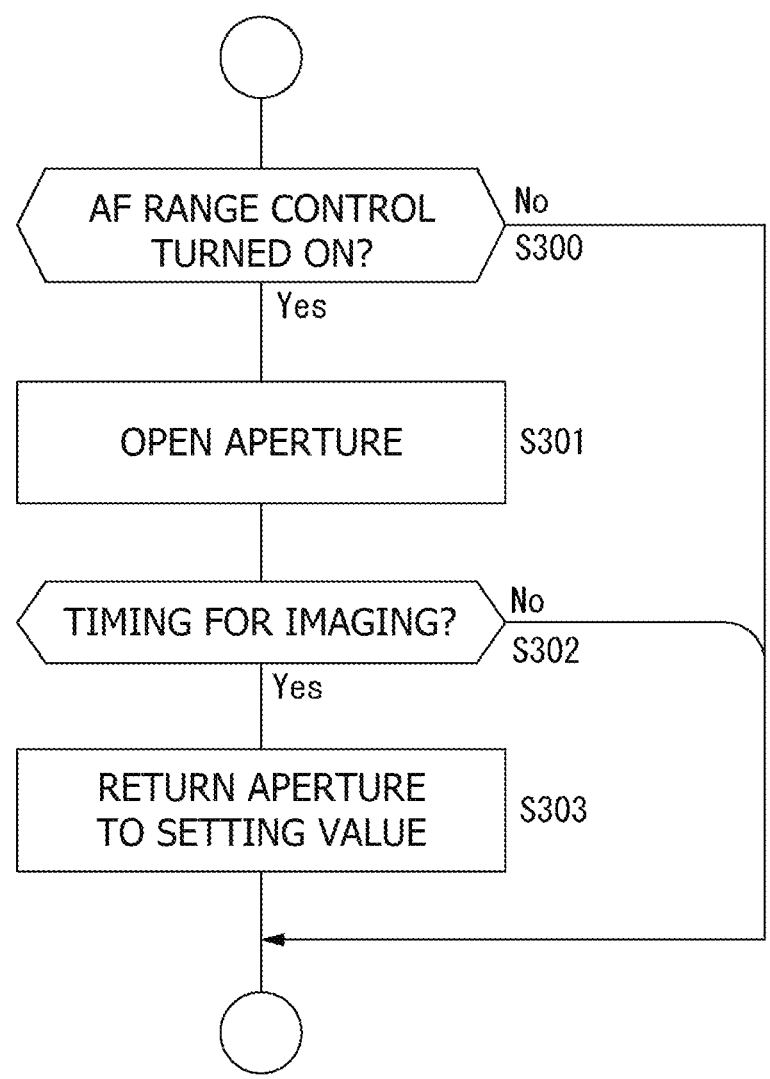
FIG. 12 is a flowchart illustrating a process performed on an aperture mechanism according to the embodiments.

FIG. 12 illustrates an example of control exercised by the camera control section 30.

According to the process depicted in FIG. 12, in a case where the AF range control function is on, the camera control section 30 proceeds from step S300 to step S301 and exercises control to open the aperture mechanism. For example, control is exercised such that the size of the opening of the aperture mechanism is equal to or larger than a predetermined size. The aperture mechanism may be controlled to be fully open or equal to a predetermined f-number on the open side. That is, the aperture mechanism is controlled to an opening that is at least greater than the predetermined f-number.

While the AF range control function is on, the camera control section 30 repeatedly proceeds to step S301, so that the aperture mechanism remains open.

In step S302, the camera control section 30 determines whether or not time has come to capture an image. Subsequently, when, for example, the user operates a shutter or starts recording a moving image so as to record a still image or a moving image as a captured image, the camera control section 30 proceeds to step S303 and returns the aperture mechanism to its setting value. More specifically, the camera control section 30 returns the aperture mechanism to the f-number that is set by the user or automatically set for image capture.

When the size of the opening of the aperture mechanism is equal to or larger than the predetermined size as described above while the AF range control function is on, depth information based on defocus information obtained from image plane phase difference can be acquired with high accuracy. Therefore, when the tracking AF operation is performed on a subject by using the AF range control function, tracking performance can be improved. Further, AF operational performance can also be improved by increasing the accuracy of the defocus information.

It should be noted that the aperture mechanism is to be opened only before the start of imaging/recording. When, for example, a release operation or an operation for starting to capture a moving image is detected, the aperture mechanism is returned to a user-defined original state. This enables a captured image to remain unaffected when the aperture mechanism is opened.

Further, when the aperture mechanism is opened in step S301, an exposure amount is increased to brighten a captured image. This increases the luminance of the through image displayed on the display section 15. Therefore, exposure adjustments are made, for example, by opening the aperture mechanism and increasing the shutter speed or decreasing the gain to be applied to the imaging signal. As a result, an image having the brightness that is intended by the user, such as the through image, can be obtained.

6. Outline and Modifications

The technology described in the embodiments provides the following advantages.

The imaging apparatus 100 according to the embodiments includes the AF processing section 31 and the AF range control section 32. The AF processing section 31 provides AF control over a target, that is, a subject within the AF range, which is set within the range of depth-direction distance. The AF range control section 32 changes the AF range settings after the subject is focused under AF control.

Turning on the AF range control function makes it easy to perform the AF operation for a desired subject regarded as the target. In addition, changing the AF range upon focusing makes it easy to maintain the in-focus state by performing the AF operation according to the subsequent movement of the subject.

The first embodiment has been described with reference to an example where the AF range control section 32 changes either of or both the near and far end settings of the AF range after the subject is focused under AF control.

For example, after focusing is achieved, the near end of the AF range is changed to a near end different from that of the AF range before focusing, the far end of the AF range is changed to a far end different from that of the AF range before focusing, or both the near and far ends of the AF range are changed to near and far ends different from those of the AF range before focusing.

In some cases, it is also conceivable that the distance range suitable as the post-focusing AF range may vary with the use case and with an imaging target. Therefore, after focusing is achieved, it is conceivable that various range settings are adopted. When such range settings are adopted, it can be expected that the AF operations appropriate for the circumstances will continuously be performed.

The second embodiment has been described with reference to an example where the AF range control section 32 changes AF range settings to those of the full range after the subject is focused under AF control.

Changing the AF range to the full range signifies changing the AF range to a range between the nearest and infinity, and corresponds to providing a state where the range is not limited, that is, substantially corresponds to turning off the AF range control function. When the AF range is changed to the full range, the AF operation can continuously be performed on the subject, irrespective of the movement of the subject which is focused.

For example, even in a case where the subject positioned within the AF range at the time of focusing moves out of the AF range after focusing is achieved, changing the AF range to the full range makes it possible to continuously perform the AF operation on the subject.

In the above case, therefore, the AF range control function not only makes it easy to perform the AF operation on a desired subject selected as the target, but also implements the AF operation in such a manner as to track the subject after focusing is achieved. Stated differently, it is possible to fulfill not only the demand for making it easy to adjust the AF operation for a target subject, but also the demand for continuously performing the AF operation on the target subject.

The embodiments have been described with reference to an example where, when the first mode is selected, the AF range control section 32 does not change the AF range settings after the subject is focused under AF control, and, when the second mode is selected, the AF range control section 32 changes the AF range settings after the subject is focused under AF control (see FIGS. 8, 10, and 11).

The first mode and the second mode are selectable. In the first mode, the AF range control function remains the same before and after focusing is achieved. That is, the AF range remains unchanged. In the second mode, however, the AF range changes before and after focusing is achieved. Therefore, the AF range control function can be executed according to the user's intention. More specifically, switching between the first mode and the second mode makes it possible to use the AF range control function in a state appropriate for a scene where an image is captured.

Further, when the AF range control function is turned on in a situation where the first mode is unavailable, the second-mode processing may constantly be performed as described with reference to FIGS. 8 and 11. Stated differently, it is conceivable that step S124 of FIGS. 8 and 11 is skipped in some cases.

The embodiments have been described with reference to an example where, while tracking AF control is executed as the AF control in order to track and focus on a subject, the AF range control section 32 changes the AF range settings after the subject is focused (see FIGS. 8 and 11).

Stated differently, in a case where tracking AF is executed, the AF range is changed, for example, to the full range after focusing is achieved. However, in a case where tracking AF is not executed, the AF range remains unchanged even after focusing is achieved.

Changing the AF range after focusing is most effective in a case where the subject is to be continuously tracked. When such an AF range change is limited to the above case, it is possible to prevent an AF operation not desired by the user, resultant from an unintended AF range change.

However, the above example applies to a case where the AF range is changed only during tracking AF. Even while AF control is being executed without exercising tracking AF, the AF range may be changed after focusing. That is, it is also conceivable that step S123 of FIGS. 8 and 11 may be skipped in some cases.

The embodiments have been described with reference to an example where the operating element for turning on/off the AF range control function is provided. Since the operating element for turning on/off the AF range control function is provided, the user is able to turn on/off the AF range control function at a desired time point including a time point within a period during which the AF operation is being performed. This makes it possible to properly handle a situation where the AF range is not to be changed, for example, to the full range immediately after the subject is focused.

More specifically, in a situation where the AF range control function is turned on and used to switch to the full range after focusing is achieved, the AF operation is to be performed again when, for example, a desired subject has not been focused or a plurality of desired subjects are within the range. In the above situation, if the AF range is changed to the full range after an undesired subject is focused, a considerable amount of time may be required, in some cases, for reperforming the AF operation. However, since the operating element for turning on/off the AF range control function is provided, it is easy to perform the AF operation on a desired subject within a predetermined AF range in the above circumstances by turning off the AF range control function and then turning on the AF range control function.

The embodiments have been described with reference to an example where the custom button 43C1 (or 43C2) is provided as the operating element capable of selectively setting an operation function of turning on/off the AF range control function.

Consequently, an increased degree of freedom of use is provided because the user is able to select desired settings for AF range control function turn-on/turn-off. Further, in a case where a plurality of custom buttons such as the custom buttons 43C1 and 43C2 are provided, the user is able to select which custom button is to be used as the on/off operating element, and thus adopt the settings matching a user's mode of use.

Further, the custom button such as the custom button 43C1 may be selectively defined so as not to perform the AF range control function on/off operation. For example, a selection can also be made such that the AF range control function is to be turned on/off only through the menu operation.

The embodiments have been described with reference to an example where the AF range control function on/off operation is to be performed by only one operating element, such as the custom button 43C1.

The AF range control function may be turned on or off by using a toggle button that works independently of other menu operations. More specifically, when the AF range control function can be turned on and off by use of a toggle operation of one operating element, the user is able to control the AF range control function easily and promptly. For example, an operation of changing an AF target subject can easily be performed by turning off the AF range control function and then turning it on immediately.

The embodiments have been described with reference to an example where the operating element, such as the custom button 43C2, is provided for switching between the first mode and the second mode.

Consequently, as for the AF range control function, either the first mode or the second mode can easily be selected. The first mode does not change the AF range before and after focusing is achieved. Meanwhile, the second mode changes the AF range before and after focusing is achieved. As a result, the user is able to change the mode at a desired time point depending on the situation and selectively use the AF range control function in a manner appropriate for the situation.

The embodiments have been described with reference to an example where the AF range control section 32 sets the range of the depth-direction distance as the AF range according to an operation input.

Since the user is able to set a desired distance range as the AF range, the AF range suitable for a situation where an image is captured can be used to provide AF control by exercising the AF range control function.

The embodiments have been described with reference also to an example where the AF range control section 32 sets the post-focusing AF range according to an operation input.

Since the user is able to set a desired AF range that is to be changed after focusing, it is possible to use the post-focusing AF range suitable for a situation where an image is captured. For example, the user may input a distance range to set it as the post-focusing AF range or may be enabled to select a specific distance range or the full range as the post-focusing AF range.

The embodiments have been described with reference also to an example where the AF range control section 32 sets the in-plane region of a captured image as the AF range.

The AF range provided by the AF range control function can be set not only as the distance range in the depth direction (Z-direction) but also as the in-plane direction region, that is, the XY direction region (AF area). Consequently, the AF range is set in the three-dimensional directions of X, Y, and Z so as to provide AF control over a subject within such AF range.

Since not only the Z-direction but also the XY-direction are limited as the AF range as described above, a desired subject can be captured more accurately.

The embodiments have been described with reference to an example where the AF processing section 31 provides AF control over a subject within the AF range in such a manner that the size of the opening of the aperture mechanism is equal to or larger than a predetermined size (see FIG. 12).

More specifically, while the AF range control function is on, the size of the opening of the aperture mechanism is equal to or larger than the predetermined size. Since the accuracy of the defocus information and depth information can be increased by opening the aperture mechanism, the subject within the AF range can be determined more accurately when the aperture mechanism is open. Additionally, the AF operational performance can also be improved.

The processing performed to change the focusing target subject at the time of AF operation or tracking AF, which has been described in each of the foregoing embodiments, can be applied to both still image capture and moving image capture.

The program according to the embodiments causes, for example, the CPU, the DSP, or a device including the CPU and the DSP to perform the processes depicted in FIGS. 8, 9, 11, and 12.

More specifically, when providing AF control over a subject within the AF range that is set within the range of the depth-direction distance, the program according to the embodiments causes the information processing apparatus to perform a process of changing the AF range settings after the subject is focused.

The program described above ensures that the imaging apparatus 100 of the present disclosure can easily be implemented by use of the information processing apparatus. For example, when the above-described program is installed on the information processing apparatus equipped with an image capturing function, such as a smartphone, a tablet terminal, or a personal computer, the AF range control function described in conjunction with the embodiments can be implemented at the time of image capture.

The above-described program can be pre-recorded, for example, in an HDD (Hard Disk Drive) or other recording medium built in a computer or pre-recorded in a ROM or the like in a microcomputer having a CPU.

Alternatively, the above-described program can be temporarily or permanently stored (recorded) in a removable recording medium such as a flexible disc, a CD-ROM (Compact Disc Read Only Memory), an MO (Magneto Optical) disc, a DVD (Digital Versatile Disc), a Blu-ray disc (registered trademark), a magnetic disc, a semiconductor memory, or a memory card. Such a removable recording medium can be supplied as what is generally called package software.

Further, as an alternative to the method of installing the program, for example, on a personal computer from a removable recording medium, the program can also be downloaded from a download site via a network such as a LAN (Local Area Network) or the Internet.

It should be noted that the advantages described in this document are merely illustrative and not restrictive. The present technology can additionally provide advantages other than those described in this document.

Additionally, the present technology can also adopt the following configurations.

(1)
An imaging apparatus including:
an autofocus processing section that executes autofocus control over a subject within a focus range, the focus range being set as a range of a depth-direction distance; and
a focus range control section that changes settings of the focus range after the subject is focused under the autofocus control.

(2)
The imaging apparatus according to (1) above,
in which the focus range control section changes the settings of either of or both near and far ends of the focus range after the subject is focused under the autofocus control.

(3)
The imaging apparatus according to (1) above,
in which the focus range control section changes the settings of the focus range to the settings of a full range after the subject is focused under the autofocus control.

(4)
The imaging apparatus according to any one of (1) to (3) above,
in which, when a first mode is selected, the focus range control section does not change the settings of the focus range after the subject is focused under the autofocus control, and,
when a second mode is selected, the focus range control section changes the settings of the focus range after the subject is focused under the autofocus control.

(5)
The imaging apparatus according to any one of (1) to (4) above,
in which, in a case where the autofocus control is executed as tracking autofocus control for tracking and focusing on the subject, the focus range control section changes the settings of the focus range after the subject is focused.

(6)
The imaging apparatus according to any one of (1) to (5) above, further including:
an operating element that turns on/off a range control function, the range control function executing autofocus control over a subject within the focus range.

(7)
The imaging apparatus according to (6) above, further including:
an operating element that is able to selectively set an operation function of turning on/off the range control function.

(8)
The imaging apparatus according to (6) or (7) above,
in which the range control function is turned on/off by operating an operating element in a toggling manner.

(9)
The imaging apparatus according to (4) above, further including:
an operating element that switches between the first mode and the second mode.

(10)
The imaging apparatus according to any one of (1) to (9) above,
in which the focus range control section sets the range of the depth-direction distance as the focus range according to an operation input.

(11)
The imaging apparatus according to any one of (1) to (10) above,
in which the focus range control section sets a post-focusing focus range according to the operation input.

(12)
The imaging apparatus according to any one of (1) to (11) above,
in which the focus range control section also sets an in-plane region of a captured image as the focus range.

(13)
The imaging apparatus according to any one of (1) to (12) above,
in which, in a case where the autofocus processing section executes autofocus control over the subject within the focus range, the autofocus processing section controls an aperture mechanism in such a manner that a size of an opening of the aperture mechanism is equal to or larger than a predetermined size.

(14)
A focus control method for use in an imaging apparatus, including:
in a case where autofocus control is executed over a subject within a focus range that is set within a range of a depth-direction distance, performing a process of changing settings of the focus range after the subject is focused.

(15)
A program for causing an information processing apparatus to perform:
in a case where autofocus control is executed over a subject within a focus range that is set within a range of a depth-direction distance, a process of changing settings of the focus range after the subject is focused.

REFERENCE SIGNS LIST

12: Imaging element
13: Camera signal processing section
18: Sensor section
30: Camera control section
31: AF processing section
32: AF range control section
41: Display panel
43: Operating element
43C1, 43C2: Custom button
50: AF area frame
51: Focus frame
100: Imaging apparatus
101: Main body housing
102: Lens barrel

The invention claimed is:

1. An imaging apparatus comprising:
a memory storing a program, and
at least one processor configured to execute the program to perform operations comprising:
executing an autofocus processing that executes autofocus control over a subject within a focus range, the focus range being set as a range of a depth-direction distance;
changing settings of the focus range after the subject is focused under the autofocus control,
wherein, when a first mode is selected, the settings of the focus range are not changed after the subject is focused under the autofocus control, and
when a second mode is selected, the settings of the focus range are changes after the subject is focused under the autofocus control;
determining whether a button indicating one push toggling among modes is activated; and
automatically switching from the first mode to the second mode, or from the second mode to the first mode, where it is determined that the button is activated.

2. The imaging apparatus according to claim 1, wherein the operations further comprise:
changing the settings of either of or both near and far ends of the focus range after the subject is focused under the autofocus control.

3. The imaging apparatus according to claim 1, wherein the operations further comprise:
changing the settings of the focus range to the settings of a full range after the subject is focused under the autofocus control.

4. The imaging apparatus according to claim 1, wherein, the operations further comprise:
in a case where the autofocus control is executed as tracking autofocus control for tracking and focusing on the subject, changing the settings of the focus range after the subject is focused.

5. The imaging apparatus according to claim 1, wherein the operations further comprise:
turning on/off a range control function, the range control function executing autofocus control over a subject within the focus range.

6. The imaging apparatus according to claim 1, wherein the operations further comprise:
setting a range of a depth-direction distance as the focus range according to an operation input.

7. The imaging apparatus according to claim 6, wherein the operations further comprise:
setting a post-focusing focus range according to the operation input.

8. The imaging apparatus according to claim 1, wherein the operations further comprise:
setting an in-plane region of a captured image as the focus range.

9. The imaging apparatus according to claim 1, wherein, the operations further comprise:
in a case where autofocus control is executed over the subject within the focus range, controlling an aperture mechanism in such a manner that a size of opening of the aperture mechanism is equal to or larger than a predetermined size.

10. A focus control method for use in an imaging apparatus, comprising:
- executing an autofocus processing that executes autofocus control over a subject within a focus range, the focus range being set as a range of a depth-direction distance;
- changing settings of the focus range after the subject is focused under the autofocus control,
- wherein, when a first mode is selected, the settings of the focus range are not changed after the subject is focused under the autofocus control, and
- when a second mode is selected, the settings of the focus range are changes after the subject is focused under the autofocus control;
- determining whether a button indicating one push toggling among modes is activated; and
- automatically switching from the first mode to the second mode, or from the second mode to the first mode, where it is determined that the button is activated.

11. A non-transitory computer readable medium storing a program, the program being executable by at least one processor to perform operations comprising:
- executing an autofocus processing that executes autofocus control over a subject within a focus range, the focus range being set as a range of a depth-direction distance;
- changing settings of the focus range after the subject is focused under the autofocus control,
- wherein, when a first mode is selected, the settings of the focus range are not changed after the subject is focused under the autofocus control, and
- when a second mode is selected, the settings of the focus range are changes after the subject is focused under the autofocus control;
- determining whether a button indicating one push toggling among modes is activated; and
automatically switching from the first mode to the second mode, or from the second mode to the first mode, where it is determined that the button is activated.

12. The non-transitory computer readable medium according to claim 11, wherein the operations further comprise:
- changing the settings of either of or both near and far ends of the focus range after the subject is focused under the autofocus control.

13. The non-transitory computer readable medium according to claim 11, wherein the operations further comprise:
- changing the settings of the focus range to the settings of a full range after the subject is focused under the autofocus control.

14. The non-transitory computer readable medium according to claim 11, wherein the operations further comprise:
- in a case where the autofocus control is executed as tracking autofocus control for tracking and focusing on the subject, changing the settings of the focus range after the subject is focused.

15. The non-transitory computer readable medium according to claim 11, wherein the operations further comprise:
- turning on/off a range control function, the range control function executing autofocus control over a subject within the focus range.

16. The non-transitory computer readable medium according to claim 11, wherein the operations further comprise:
- setting a range of a depth-direction distance as the focus range according to an operation input.

17. The non-transitory computer readable medium according to claim 16, wherein the operations further comprise:
- setting a post-focusing focus range according to the operation input.

18. The non-transitory computer readable medium according to claim 11, wherein the operations further comprise:
- setting an in-plane region of a captured image as the focus range.

19. The non-transitory computer readable medium according to claim 11, wherein the operations further comprise:
- in a case where autofocus control is executed over the subject within the focus range, controlling an aperture mechanism in such a manner that a size of opening of the aperture mechanism is equal to or larger than a predetermined size.

\* \* \* \* \*